US010216546B1

(12) United States Patent
Davison et al.

(10) Patent No.: US 10,216,546 B1
(45) Date of Patent: Feb. 26, 2019

(54) COMPUTATIONALLY-EFFICIENT RESOURCE ALLOCATION

(71) Applicant: Insitu Software Limited, London (GB)

(72) Inventors: Bruce F. Davison, London (GB); Elizabeth E. Tweedale, London (GB)

(73) Assignee: Insitu Software Limited, London (GB)

( * ) Notice: Subject to any disclaimer, the term of this patent is extended or adjusted under 35 U.S.C. 154(b) by 0 days.

(21) Appl. No.: 16/030,491

(22) Filed: Jul. 9, 2018

(51) Int. Cl.
*G06F 15/177* (2006.01)
*G06F 9/50* (2006.01)
*G06F 17/30* (2006.01)
*G06F 17/50* (2006.01)

(52) U.S. Cl.
CPC ...... *G06F 9/5072* (2013.01); *G06F 17/30958* (2013.01); *G06F 17/509* (2013.01); *G06F 17/5009* (2013.01)

(58) Field of Classification Search
CPC .. G06F 9/5072; G06F 17/5009; G06F 17/509; G06F 17/30958
See application file for complete search history.

(56) References Cited

U.S. PATENT DOCUMENTS

| 6,865,538 | B2 | 3/2005 | Chithambaram et al. |
| 6,882,988 | B2 | 4/2005 | Subbu et al. |
| 9,787,705 | B1 * | 10/2017 | Love ................... H04L 63/1425 |
| 9,836,183 | B1 * | 12/2017 | Love ..................... G06T 11/206 |
| 9,911,211 | B1 * | 3/2018 | Damaraju ............. G06T 11/206 |
| 2008/0033897 | A1 * | 2/2008 | Lloyd ................... G06F 9/4488 706/19 |
| 2008/0109289 | A1 | 5/2008 | Vivadelli et al. |
| 2009/0248376 | A1 * | 10/2009 | Silva ................... H04L 41/5009 703/2 |
| 2012/0233326 | A1 * | 9/2012 | Shaffer ................... H04W 4/70 709/225 |
| 2013/0187922 | A1 * | 7/2013 | Sexton ................. G06T 11/206 345/440 |

(Continued)

OTHER PUBLICATIONS

Buluc, et al, "Recent Advances in Graph Partitioning," arXiv:1311:3144v3 [cs.DS]. Feb. 2015.

(Continued)

*Primary Examiner* — Michael Won
(74) *Attorney, Agent, or Firm* — David H. Judson

(57) ABSTRACT

A method to associate a set of first entities to a set of second entities, e.g., computing jobs to processors, agent teams to workspace resources within a physical location, or the like. The NG is seeded using a force directed graph (FDG), whose "seed" particles represents the agents and their relative interconnectedness. The FDG is first brought into an equilibrium state to define a solution space. A relative coordinate system of the FDG solution space is then translated to a number of vertices represented in the NG, and then an initial seeding of the seed particles in the NG (based on their relative positions in the FDG solution space) is carried out. A search is then performed. During the search, each seed vertex releases its embedded agents to adjacent vertices to enable the agents to search for and achieve a required count. During this process, the seed particles grow to the desired size (with their constituent first entities then located at the NG vertices) to complete the agent-to-resource allocation process.

24 Claims, 16 Drawing Sheets

(56) References Cited

U.S. PATENT DOCUMENTS

| | | | | |
|---|---|---|---|---|
| 2013/0229416 A1* | 9/2013 | Krajec | ................. | G06F 11/323 |
| | | | | 345/440 |
| 2013/0232174 A1* | 9/2013 | Krajec | .............. | G06F 17/30958 |
| | | | | 707/798 |
| 2014/0095689 A1* | 4/2014 | Borgs | ................ | G06F 17/30958 |
| | | | | 709/224 |
| 2014/0114975 A1* | 4/2014 | Rouat | ........................ | G06F 7/24 |
| | | | | 707/737 |
| 2015/0379446 A1* | 12/2015 | Blechner | ................ | G06Q 10/02 |
| | | | | 705/5 |
| 2016/0358350 A1* | 12/2016 | Glover | .................. | G06T 11/206 |
| 2017/0300657 A1* | 10/2017 | Barrett | .............. | G06F 17/30424 |
| 2018/0137155 A1* | 5/2018 | Majumdar | ........ | G06F 17/30587 |

OTHER PUBLICATIONS

Gadde, "Graph partitioning algorithms for minimizing inter-node communication on a distributed system," Theses and Dissertations, University of Toledo, http://utdr.utoledo.edu/theses-dissertations/74 (2013).

Mayer et al, "GrapH: Heterogeneity-Aware Graph Computation with Adaptive Partitioning," Proceedings of the 2016 IEEE 36th International Conference on Distributed Computing Systems (ICDCS), 2016.

Hendrickson et al, "Skewed Graph Partitioning," Proceedings of the Eighth SIAM Conference on Parallel Processing for Scientific Computing, PPSC, 1997.

Kapade, "Chapter 2 Study of Graph Partitioning Methods," 2015.

\* cited by examiner

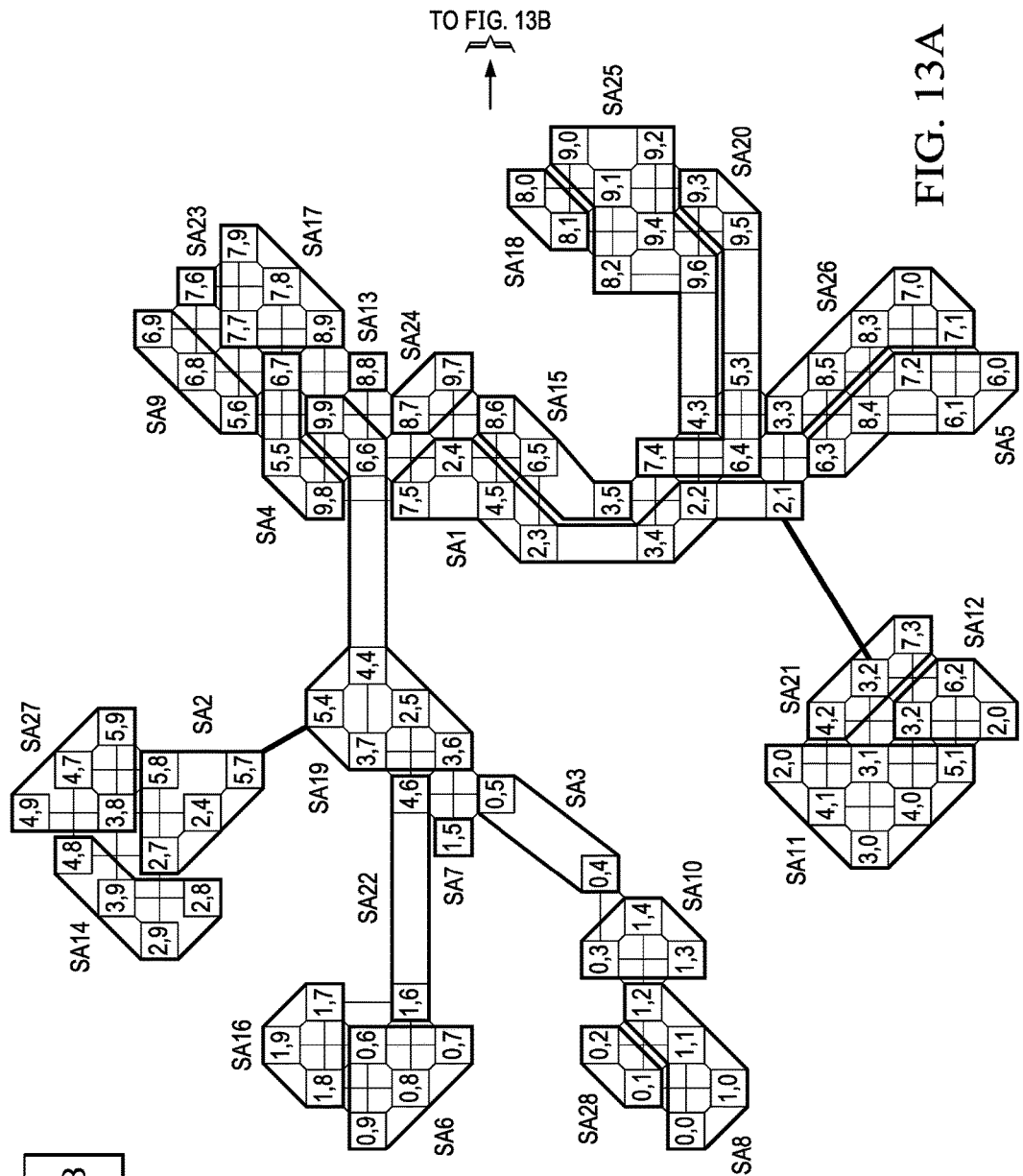

COMPUTATIONALLY-EFFICIENT RESOURCE ALLOCATION

BACKGROUND

Technical Field

This application relates generally to computer-based simulations whose computations are distributed across processors in a computing cluster.

Brief Description of the Related Art

Computer simulations have become a useful tool for the mathematical modeling of many varied types of systems in the natural and social sciences, and in engineering. The simulation of a system is represented as the running of the system's computer model, where the model comprises the algorithms and equations used to capture the behavior of the system being modeled Simulations are executed as computer programs, and these programs range is size and their computational requirements. Some are large-scale programs that run for long periods of time on a cluster of network-accessible computers (processors). In the latter case, such programs typically have large datasets and computational demands. One common approach to processing a simulation in this context involves partitioning the tasks required by the simulation across multiple computing nodes in the cluster. While this approach reduces the computational demands imposed on any individual processor, overall system performance is unsatisfactory (e.g., in terms of processing efficiency, cost, reliability, etc.) because there is often a computational requirement that individual task(s) communicate with one another. When tasks that need to communicate are located on different processing nodes, however, communications between nodes must occur, sometimes across a network. Inter-node communications introduce latencies that often impact system performance negatively.

For datasets that are structured as graphs, it is known to partition the graph dataset using graph partitioning techniques. In this context, it has also been proposed to provide graph partitioning algorithms that can execute efficiently in a computing cluster, typically by attempting to minimize inter-node communications. While these known approaches are useful, there remains a need to improve computational efficiency of a computing cluster on which large graph datasets execute.

The technique of this disclosure addresses this and other deficiencies in the prior art.

BRIEF SUMMARY

According to one aspect, the subject matter herein describes a computationally-efficient method to associate a set of first entities to a set of second entities, wherein a second entity corresponds to a vertex in a network graph (NG). The method begins by associating a grouping of first entities with a seed node of a set of seed nodes, each seed node having an attribute set. The set of seed nodes are configured into a force directed graph (FDG), which provides for a physics (particle)-based solution. In particular, the seed nodes are configured with respect to one another according to attractions or repulsions derived from the seed node attribute sets. The force directed graph is brought into an equilibrium state to define a solution space. The relative coordinate system of the FDG solution space is then translated to a number of vertices represented in the network graph, and then an initial seeding of the seed nodes in the network graph (based on their relative positions in the FDG solution space) is carried out. A local search is then performed. During the local search, each seed vertex releases its embedded agents (to adjacent vertices in the network graph) to enable the agents to search for and achieve their required count (the number of first entities in the particular grouping). During the search process, the seed nodes grow to the desired size (with their constituent first entities then located at the NG vertices) to complete the first entity-to-second entity allocation process.

The mapping of the relative coordinate system of the FDG solution space to the number of vertices represented in the network graph is enabled using an initial diffusion operation. This resulting coordinate map (e.g., an RGB-based (255, 255, 255) color mapping) creates the basis for updates from the FDG-solution to pass directly to place seed agents on the network graph. This is desirable, as it is quite likely that new SAs will be added or deleted, or that SA counts will change. Should a new SA be added/deleted, or should an individual SA count change, the FDG provides a very efficient way to re-seed only the impacted SAs in the NG, after which the local search is then re-run. This approach may also leverage a history of the prior resource-to-vertices assignments to achieve a new solution requiring the fewest possible changes to the previous agent-to-resource assignments.

Seeding the NG with the n-body FDG provides improved computational efficiency and, in particular, by avoiding random seeding, as well as local neighbor searching with respect to one or more regions in the NG that otherwise would provide substantially equally-fit solutions. Thus, the technique provides significant computationally efficiencies in terms of using less processor and memory resources, thereby reducing the cost and increasing the processing efficiency of the overall simulation technique.

In one embodiment, the resources (the second entities) are a set of computing entities (e.g., processors) in a computing cluster. The seed nodes correspond to computing jobs that require execution. In another embodiment, the resources (the second entities) are a set of physical resources, e.g., located in a physical location such as an office environment. In this alternative embodiment, the seed nodes correspond to teams of agents that require workspace resources (e.g., desks, etc.).

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 13A and FIG. 13B depict how seed coordinate values of the occupying agents update the coordinates of the underlying NG vertices.

DETAILED DESCRIPTION

Figure 1:
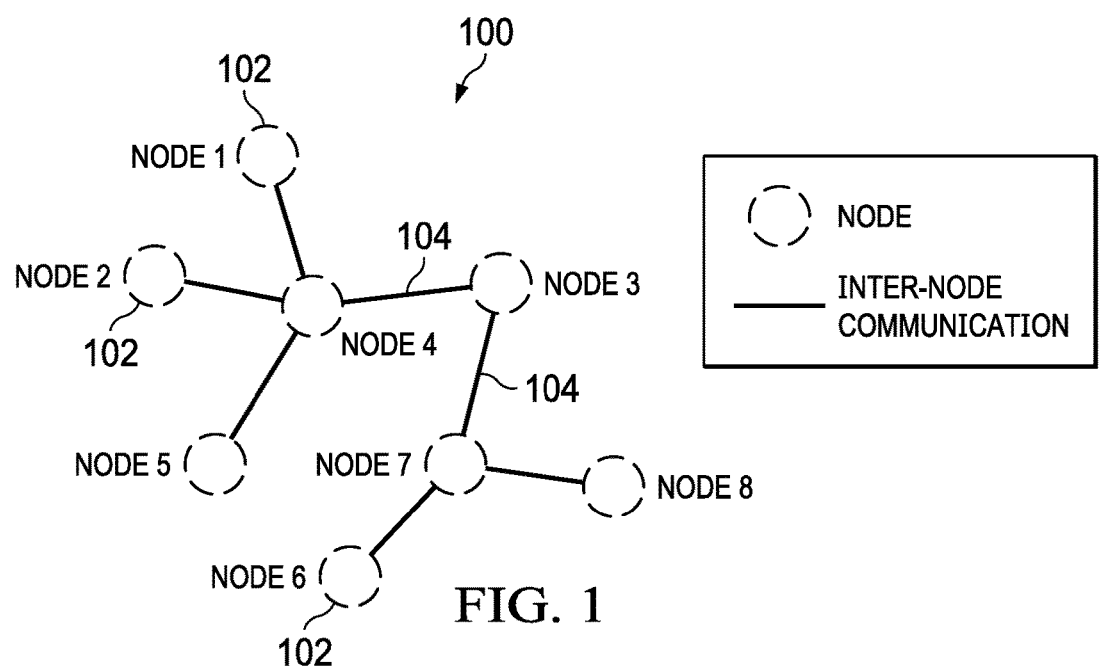
FIG. 1 depicts a representative network graph (NG) comprising a cluster of nodes and their relative inter-node connectivity to one another.

As used herein, a network graph G used for allocating first entities to second entities is denoted as G=(V, E), as a collection of vertices V and undirected edges E. As will be described, and according to the technique of this disclosure, an undirected graph and, in particular, a force directed graph (FDG), is used as a seeding algorithm for solving a first entity-to-second entity allocation problem in a computationally-efficient manner. As will be described, a FDG drawing algorithm models the graph drawing problem as a physics n-body system in which the nodes (of the FDG) act as particles, while edges thereof represent interactions between the particles. Thus, the FDG is sometimes referred to herein as a "particle system." As will be described, once the network graph is seeded from the FDG, the system is then left to evolve in the presence of "forces" that can be either attractive or repulsive depending on the nature of the edges.

The particular nature of the "first" and "second" entities is dependent on what the network graph represents. In a first embodiment, the NG represents a distributed computing network, wherein each node of the NG preferably represents a processing unit or single multi-core processor, and wherein an edge in the NG represents a communication between processing units or multi-core processors. In effect, in this embodiment the NG represents a processor communication graph for the distributed computing network. In this context, edges typically have different values (e.g., lengths) representing communication speeds. Edges connecting processors in a cluster of computers allow for fast communication, whereas edges joining distinct clusters of computers are much slower. Every additional slow edge needed for inter-process communication comes at a penalty in performance.

In this example scenario, it is assumed that the computational problem to be solved by the NG is dynamic scheduling of one or more computing jobs (workloads or tasks) to the processing units represented by the NG nodes, preferably in a manner to minimize a degree of separation between those nodes with inter-job dependencies. Dynamic scheduling of jobs to nodes (and thus processors) in the distributed computing network assumes that there are a set of jobs, wherein each job requires a number of processors for a length of time. The scheduling needs to take into account whether the jobs are dependent on each other. These dependencies typically are determined by one or more "attributes" associated with a job. In the distributed computing context, an attribute may be given processing requirement such as a (1) a data retrieval (from an external storage), (2) a shared sub-process, (3) a data share, and (4) other metadata, such as a frequency, timing or priority of a data computation. Attributes often are based on historical data such as a history or log of prior inter-process communication(s), and they may be static or (more typically) evolving, e.g., based on a near history of data use. Jobs that share attributes are sometimes referred to herein as dependent jobs. Generally, the less time it takes dependent jobs to communicate with one another the less latency in the distributed computing system. For this reason, and to improve computational efficiency, typically it is desirable to place dependent jobs in positions (i.e., with particular processors) that are the least number of edges away from one another within the processor communication graph. Such placement is sometimes referred to herein as graph partitioning.

In another example embodiment, the NG represents a physical space, such as a building having available workspace, and the scheduling problem involves scheduling the first entities (people) to physical resources (e.g., work areas) within the building. In this scenario, the first entity is an "agent" (a person), and he or she is associated with a workgroup (or team) of people that are working together to achieve a task. Thus, the team is analogous to the computing job as described above in the first embodiment. In this embodiment, the team has one or more attributes, e.g., (1) expertise or skill of the individual agents, (2) a task classification (e.g., product category, market category, regulatory restriction, etc.), and the like. In this scenario, it is assumed that the team can be more effective in completing the job at hand if the team collaborates with other team(s), perhaps those with complementary expertise, work experience, product or marketing goals, etc. Thus, in this scenario the physical placement of teams within the building may seek to optimize that collaboration, e.g., by placing such teams physically near one another. Conversely, if teams are working on projects with different requirements (e.g., regulatory requirements), it may be desirable to locate those teams apart from one another. Thus, in the context of this alternative embodiment, and instead of processors (as in the first embodiment described above), the NG nodes represent teams (groups of people working together), whereas edges between and among nodes represent degrees to which teams are associated to one another. As in the distributed computing example, however, a goal of the graph partitioning is to minimize a degree of separation between nodes with inter-job dependencies.

Generalizing, a domain decomposition approach to problem partitioning typically involves first decomposing the data associated with a problem. If possible, the data is divided into small pieces of approximately equal size. Next, the computation that is to be performed is partitioned, typically by associating each operation with the data on which it operates. This partitioning yields a number of tasks, each comprising some data and a set of operations on that data. An operation may require data from several tasks. In such case, communication (namely, inter-process communication (IPC)) is required to move data between tasks, and a goal is to minimize such communication.

Figure 2:
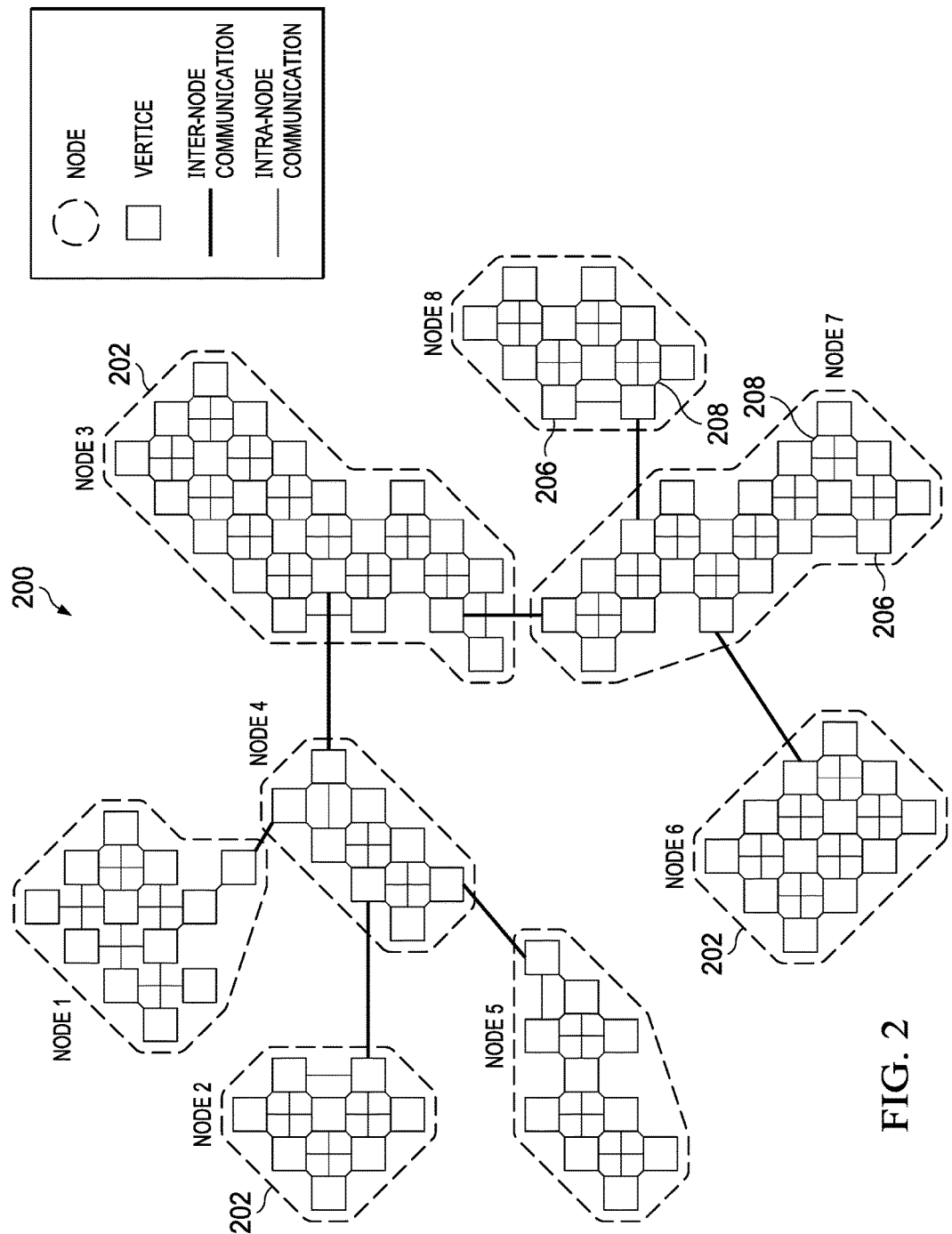
FIG. 2 provides detailed depiction of the network graph shown in FIG. 1, wherein each node in the NG comprises a set of processing units (e.g., processors) located at respective vertices, as well as their relative intra-node connectivity within the node.

With the above as background, reference is now made to FIG. 1, which depicts a representative network graph (NG) 100 comprising a cluster of nodes 102 and their relative inter-node connectivity to one another. In this example, the distributed computing embodiment is described, although the technique applies with respect to the alternative embodiment (work team allocation). In this embodiment, and as has been described, the nodes 102 represents processing clusters (or more generally sets of processing units), and nodes communicate with one another over inter-node communication paths depicted as NG edges 104. FIG. 2 provides a detailed depiction of the network graph shown in FIG. 1, wherein each node 202 of the NG 200 comprising a set of processing units (e.g., processors) located at respective vertices 206 within the node. Vertices within a node 202 communicate with one another, according to an intra-node communication (represented by a line 208 between vertices within a node). Thus, FIG. 2 depicts both the inter-node communications (edges) 204, as well as the relative intra-node communications 208 within the node, i.e., between and among the vertices 206 of the node. In the alternative embodiment (the work team allocation), each node 102 in FIG. 1 represents a team (or "set") of agents, and the edges 104 represent team dependencies; thus, in FIG. 2, the vertices 206 within a team node 202 typically represent physical workspace resources, such as desks, that may be assigned to the agents within a particular team. Of course, the topology and number of nodes/vertices shown in FIGS. 1 and 2 are merely representational.

Figure 3:
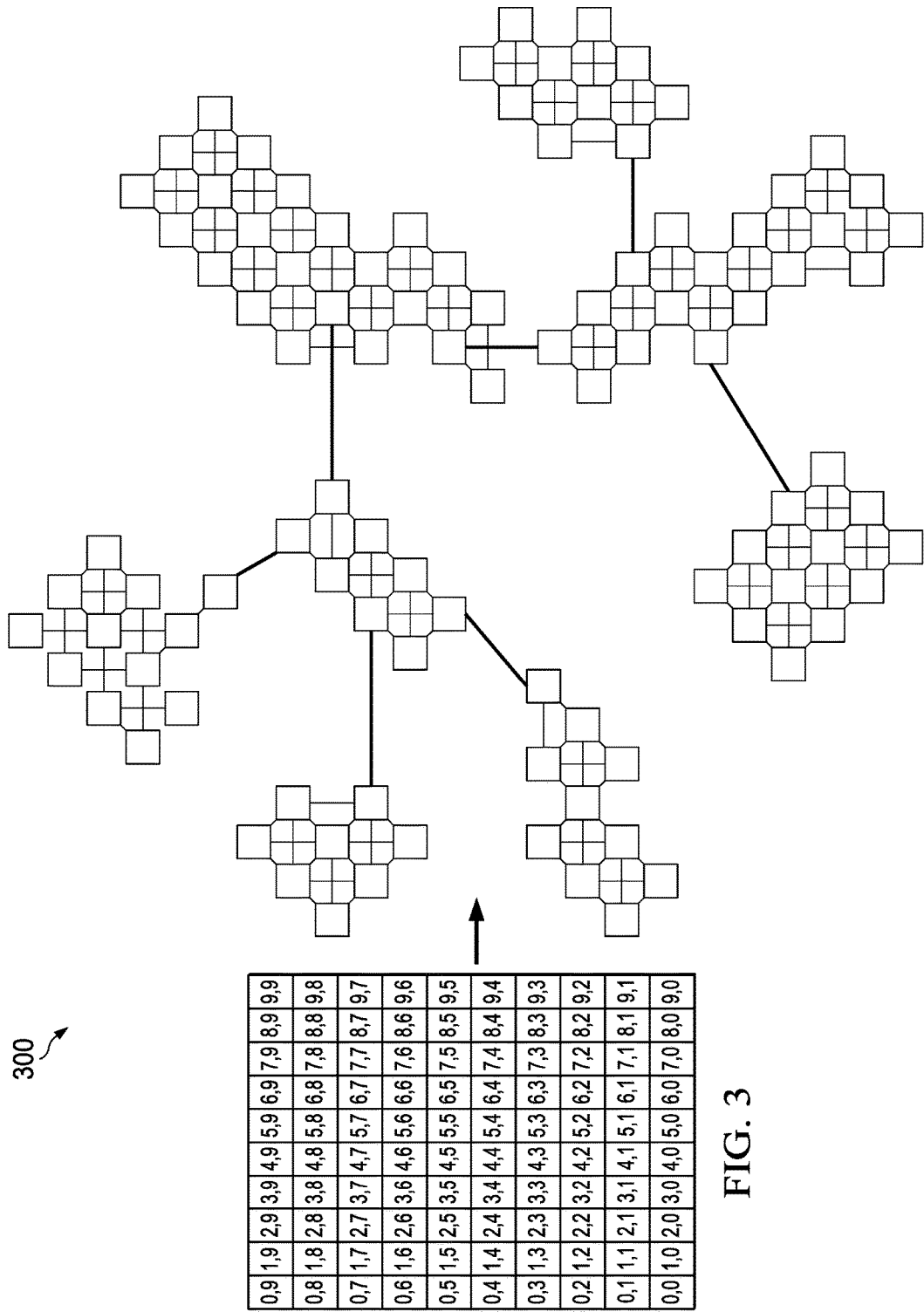
FIG. 3 depicts a representative two-dimensional (2D) coordinate space for the NG of FIG. 2 and in which a physics-based force directed graph (FDG) will be solved to create a bijection according to a first aspect of this disclosure.
Figure 4:
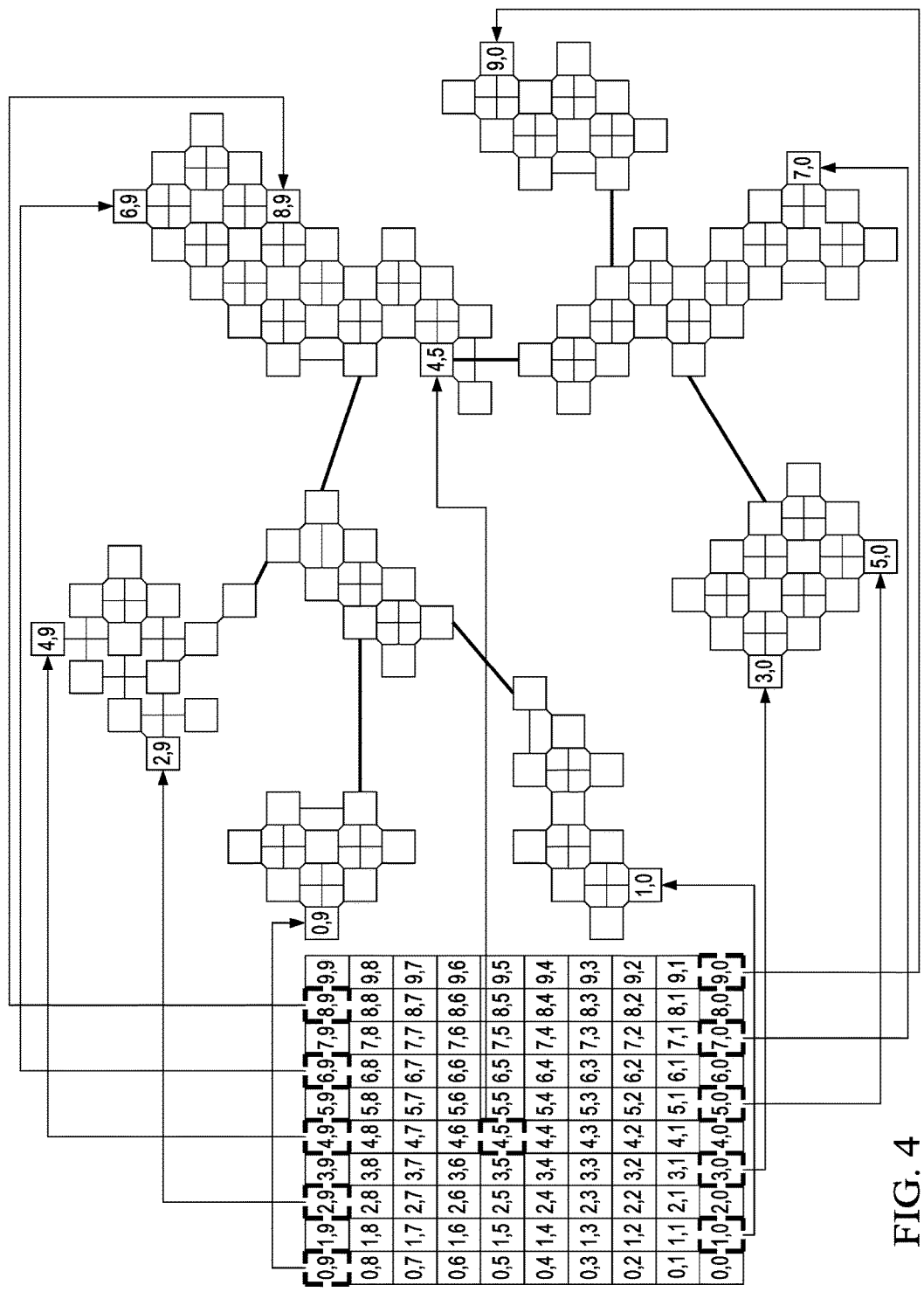
FIG. 4 represents an initial seeding of the vertices of the NG of FIG. 2 by coordinates derived from the representative 2D coordinate space shown in FIG. 3.
Figure 5:
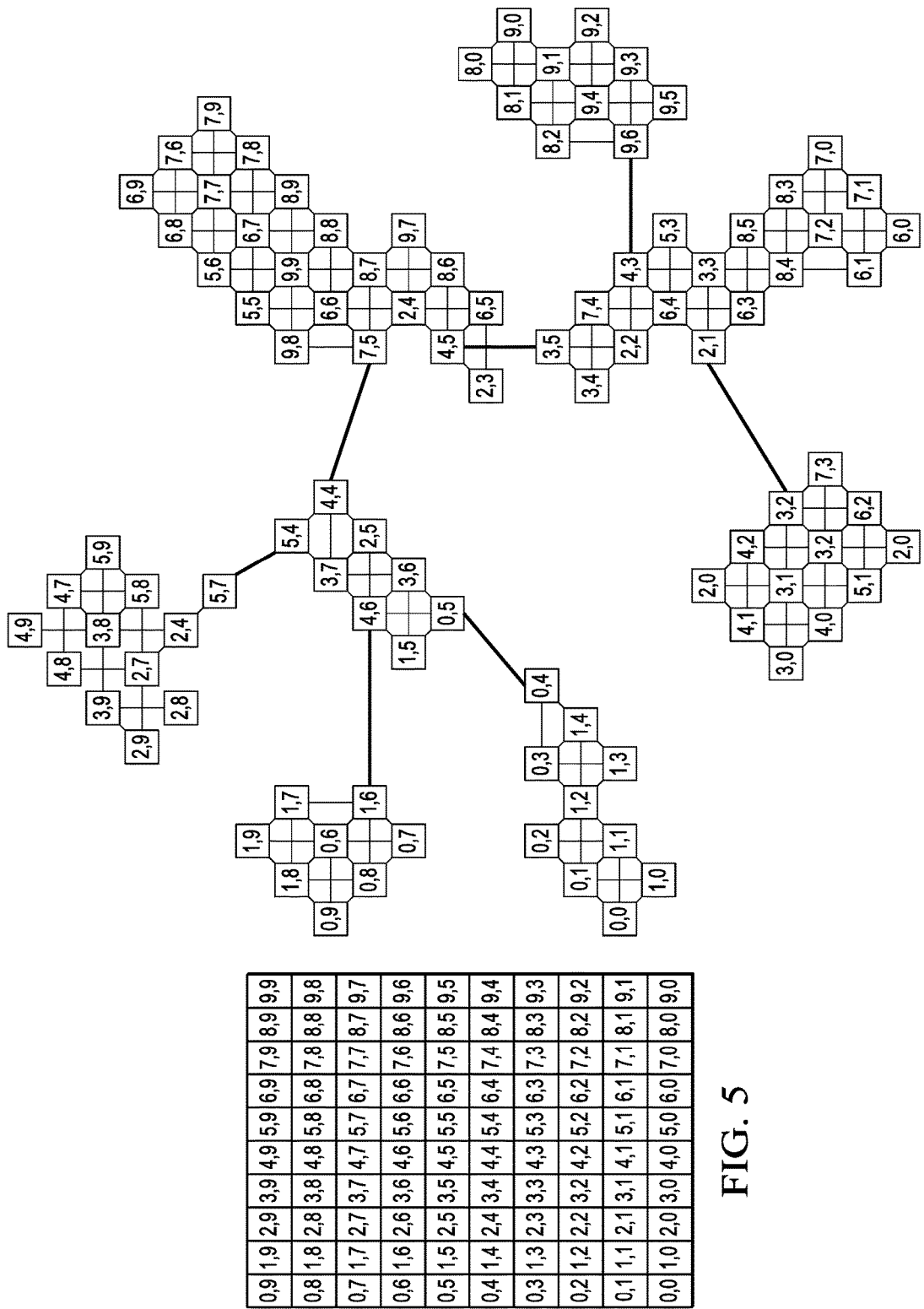
FIG. 5 represents the completed seeding of the vertices of the NG of FIG. 2 by the coordinates derived from the representative 2D coordinate space shown in FIG. 3.

According to the technique of this disclosure, FDG seeding of the NG is implemented to facilitate scheduling of the first entities to the second entities, preferably in a manner that minimizes inter-node communication between and among graph nodes, while as the same time maximizing intra-node communication between and among vertices within a particular node. While the above-identified use cases (distributed computing, and agent-to-physical resource mapping) take advantage of this approach, any scheduling problem that can be configured into a partitioned network graph may implement the FDG-seeding process, which is now described. FIG. 3 depicts a representative two-dimensional (2D) coordinate space 300 for the NG (reference numeral 100, in FIG. 1, and numeral 200 in FIG. 2) and in which a physics-based force directed graph (FDG) is desired to be and will be solved. The solution space 300 is two-dimensional, but this is not a limitation. FIG. 4 represents an initial seeding of the vertices of the NG 200 of FIG. 2 by coordinates derived from the representative 2D coordinate space 300 shown in FIG. 3. FIG. 5 represents the completed seeding of the vertices of the NG 200 of FIG. 2 by the coordinates derived from the representative 2D coordinate space 300 shown in FIG. 3. This process is sometimes referred to herein as "bijection," and the details for this process follow below.

Figure 6:
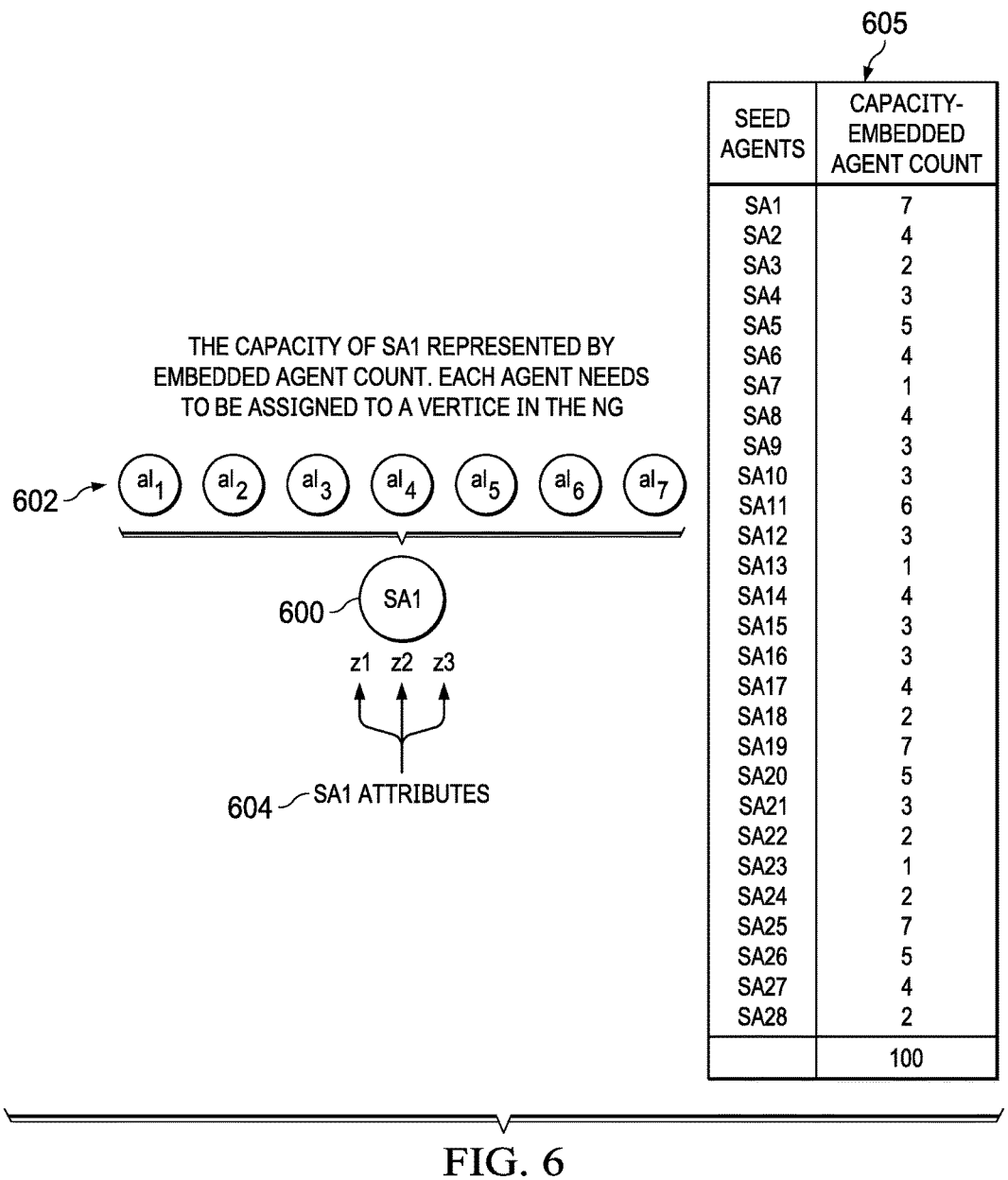
FIG. 6 depicts a seed agent (SA) node that represents a population of embedded agents that are being assigned to a set of physical resources in a space allocation problem that is addressed by the force directed graph (FDG) network graph (NG)-seeding technique of this disclosure.
Figure 7:
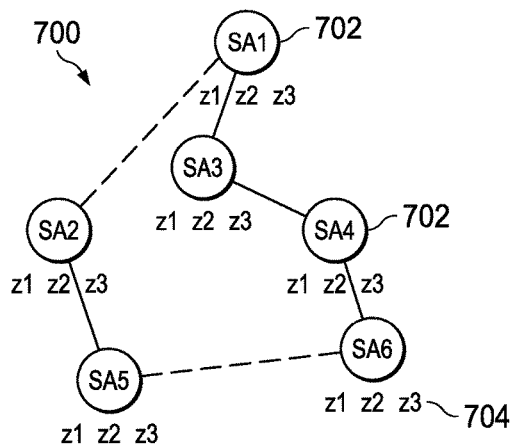
FIG. 7 depicts a portion of a FDG depicting a group of SA nodes and their interactions based on gravity-type forces in a physics simulation.
Figure 9:
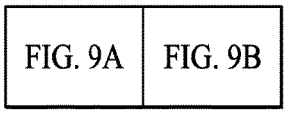
FIG. 9A and FIG. 9B depict a physics-based simulation of the packing of the SA nodes from the FDG based on their embedded agent count(s)
Figure 8:
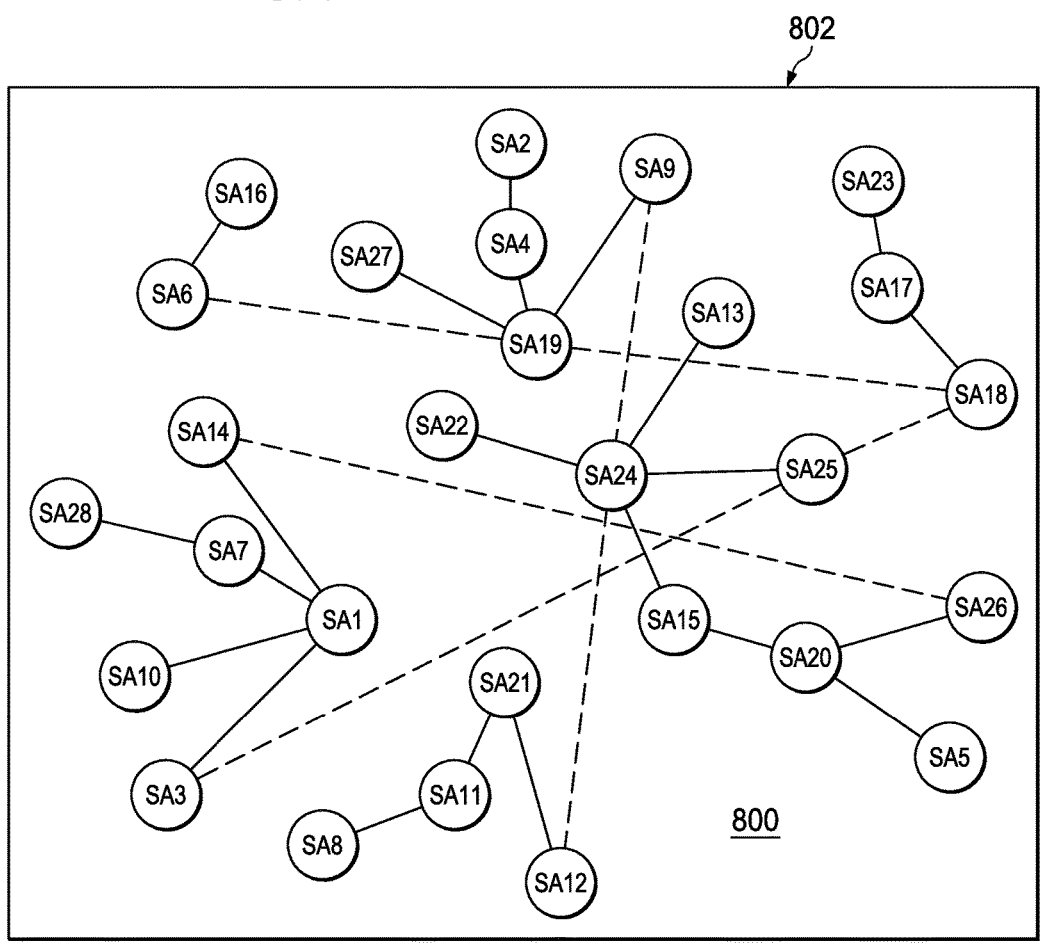
FIG. 8 depicts a FDG brought into equilibrium in a solution space using a physics-based simulation.

FIG. 6 depicts a Seed Agent (SA) node 600, which is the basic component of the FDG. As noted above, the first entity-to-second entity allocation problem involves allocating computing jobs to processors, or agents to physical resources, or other such allocation problems. For illustrative purposes, the agent-to-physical resource allocation problem is depicted here. This use case is merely for exemplary purposes. Thus, and in this context, each SA particle 600 represents a population of embedded agents (A) 602, wherein each agent needs to be assigned to a resource vertex V in the network graph (NG). In this example, and as depicted in the table 605, it is assumed that there are twenty-eight (28) different seed agents, and each seed agent has an associated agent count representing the capacity of that seed agent. As will be seen, a seed agent 600 acts as a particle in a physics n-body system. In that system, spring-type edges are created between pairs of particles if an interaction exists, and the interaction can either be a positive (an "attraction") or negative (a "repulsion"). Each SA particle 600 has a set of attributes 604 (e.g., identified as {z1, z2, z3}) that drive the attractions and repulsions to other SA particles in the physics-based system. There may be additional attributes (and the values associated with these attributes will depend on the allocation problem). FIG. 7 depicts a portion 700 of the FDG depicting a group of SAs 702 attracting (solid lines) and repulsing (dashed lines) based on gravity-type forces in a physics-based simulation. Dashed lines indicate that the particles have no need to communicate with one another. The attractions and repulsions result from the SA particle attributes 704. FIG. 8 depicts a FDG 800 brought into equilibrium (sometimes referred to herein as being "frozen") using a physics-based simulation. The objective is to reduce crossing edges and equally fill the solution space 802, which is depicted in this example as a square. The solution space is depicted here as two-dimensional (2D) for convenience of illustration, but the space may be three-dimensional (3D) or even "n"-dimensional.

In this modeling technique, the "strength" of a spring is higher if the SA-to-SA particle interaction is two-way as opposed to only one-way (e.g., from particle A to particle B, but not from B to A). Positive interactions require the spring to find a resting length vector that has a short length/magnitude relative to the extents of the overall n-body solution space 802. Conversely, negative interactions require the edge or vector to have a relatively long length/magnitude relative to the overall n-body solution space. As depicted in FIG. 8, the n-body solution space is defined by a boundary 802 (a solution space) within which all the particles are contained. To keep the particles separated and to avoid collapse of the n-body system, an electric type force (attractive or repulsive) is used to separate all particles. Attractions are indicated by solid lines; repulsions are indicated as dotted lines. The mass of the particle in the FDG is determined by the number of embedded agents represented by the SA (the particle). In addition, preferably a central gravity type-force, which is proportional to the mass of the particles, is used to help the springs influence heavier particles, and to provide for a more uniform distribution of particles. The FDG solution space shown in FIG. 8 needs to be "filled." To this end, the solution space should optimize a ratio of edge lengths between strong affinities/attractions, weak affinities/attractions, and repulsions. Further, edge lengths of all the strong affinities need to be shorter than all the edge lengths of weak affinities, and the length of all repulsive edges need to be larger than the lengths of all types of affinities.

Figure 9A:
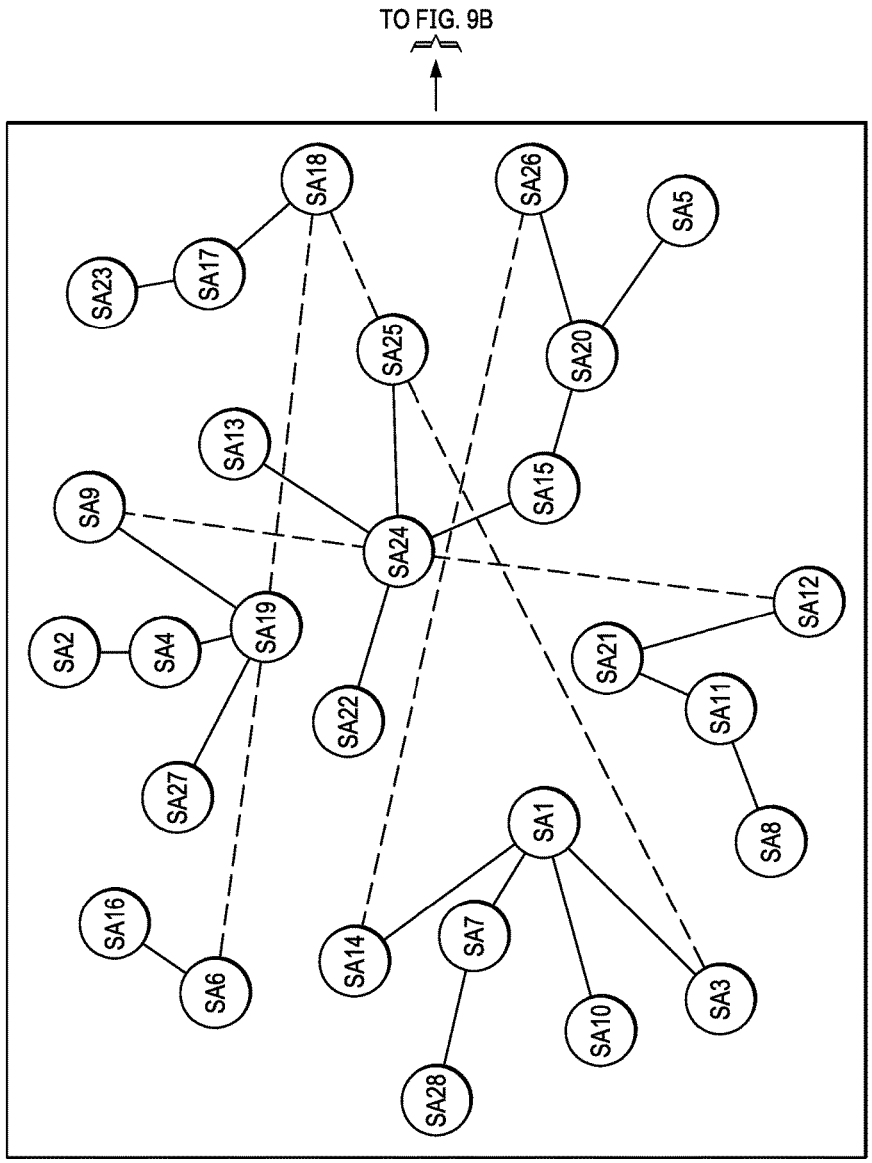
Figure 9B:
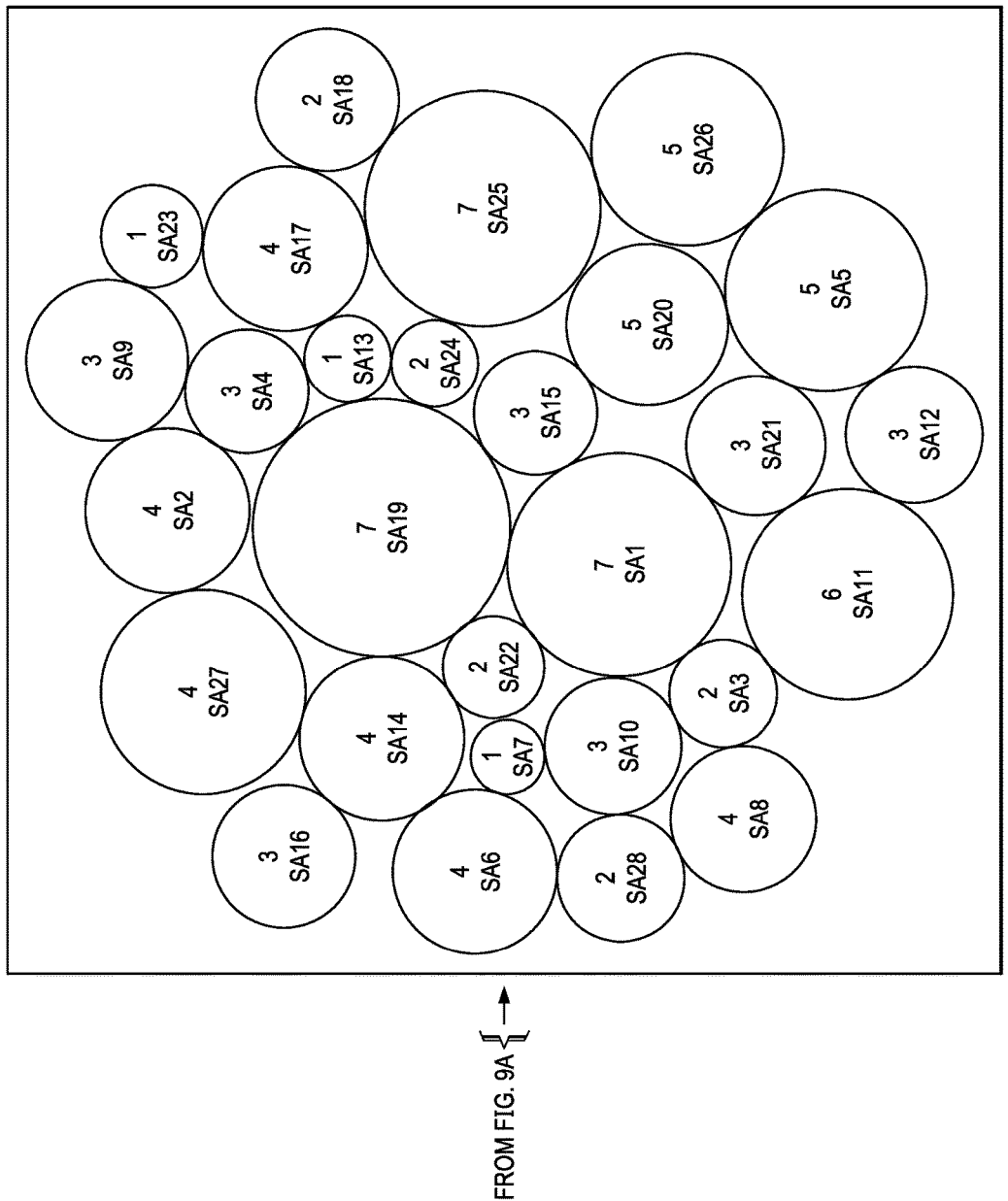
Figure 10A:
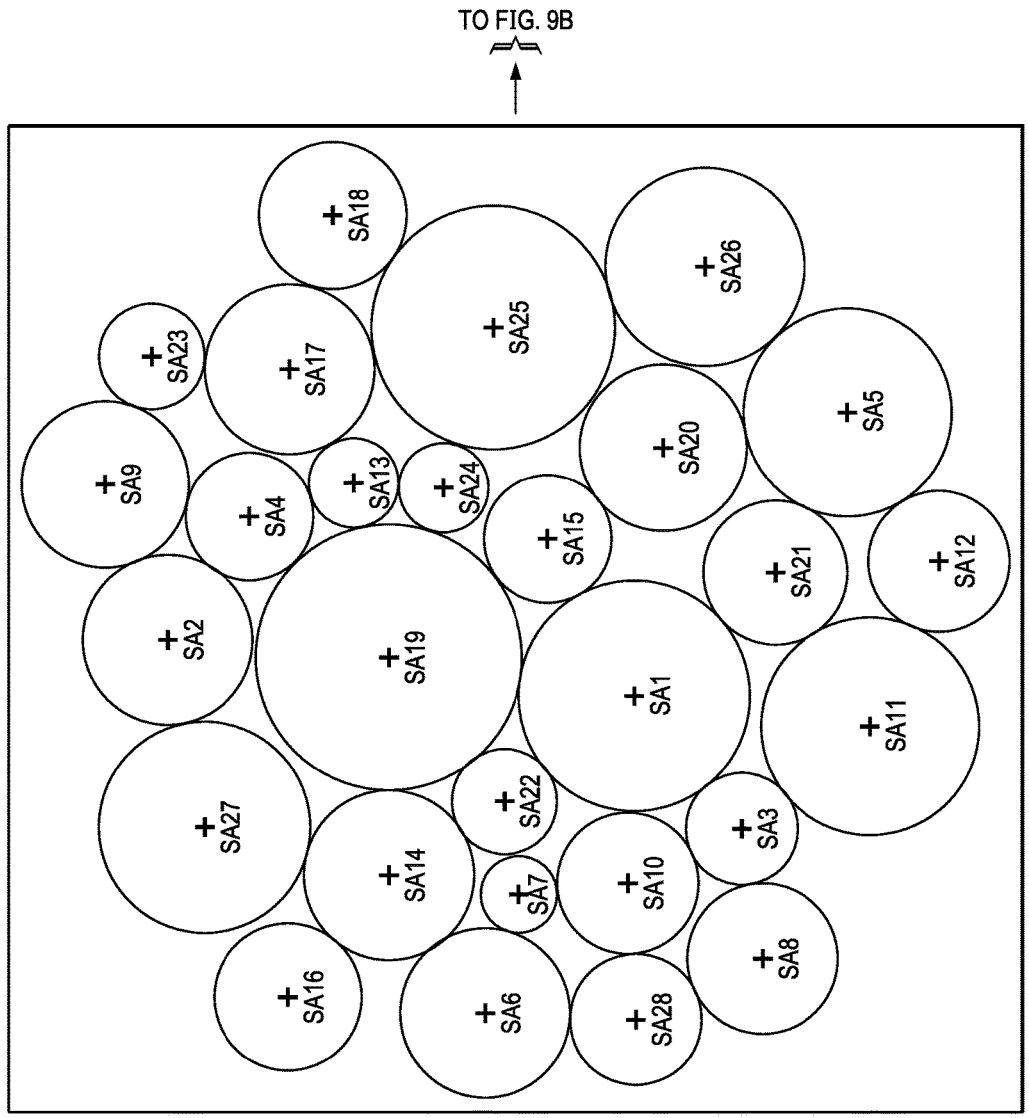
FIG. 10A and FIG. 10B depict a translation of a relative coordinate system of the FDG solution space in FIG. 9B to the vertices in the network graph and, in particular, how that SA nodes are assigned coordinates using their resting locations in the FDG solution pace.
Figure 10:
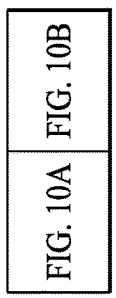
Figure 10B:
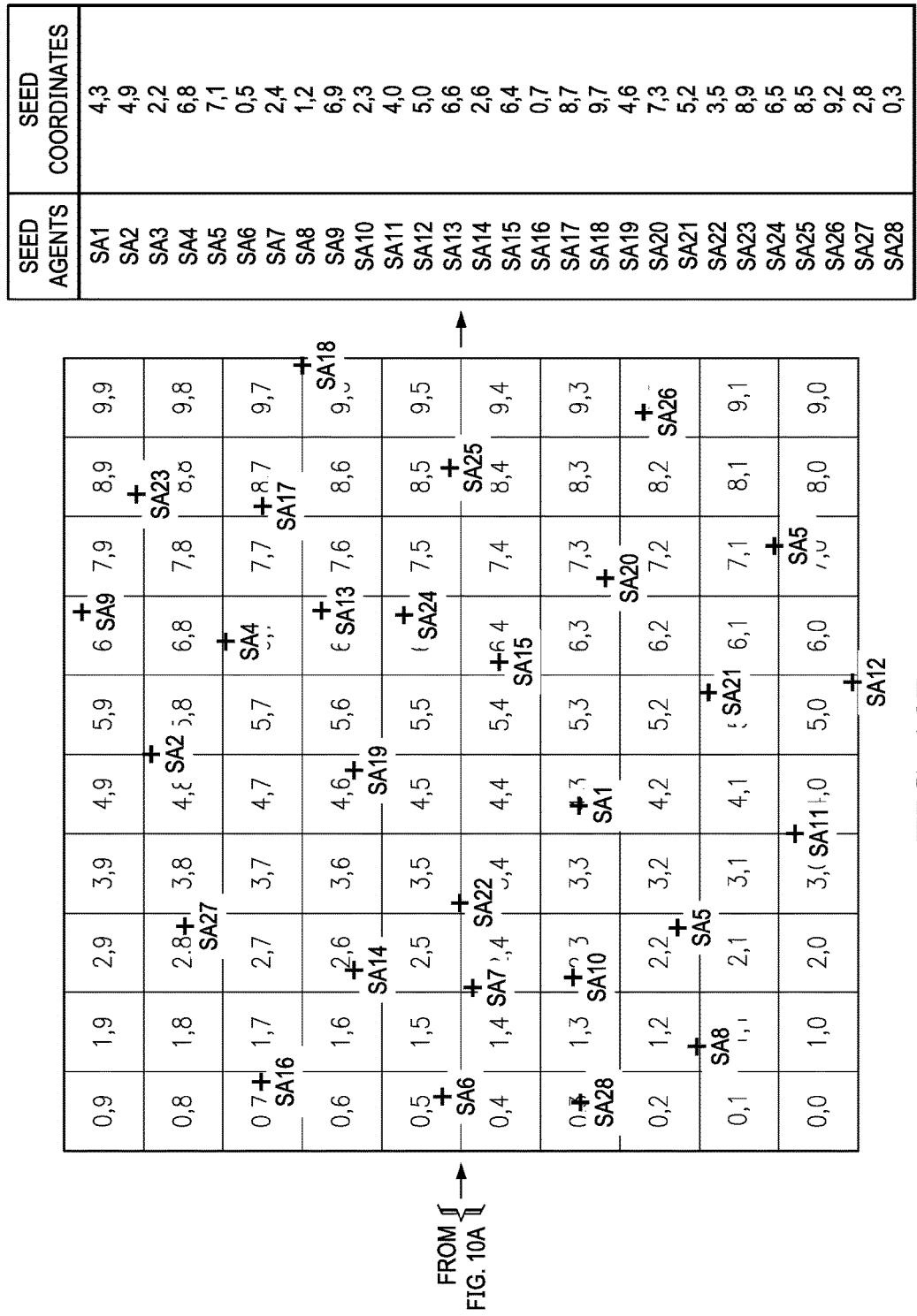

FIGS. 9A and 9B depict a physics-based simulation of the packing of the SAs based on their embedded agent counts, shown in the table. This process happens concurrently with the process of filling the FDG solution space in FIG. 8. These counts depicted in the table in FIG. 9A are merely exemplary. In this example, and as noted, there are twenty-eight (28) seed agents with a collective embedded agent count of 100 agents to be allocated. In one embodiment, a circle packing algorithm is used to grow the circles to a size representative of their embedded population relative to the total count of vertices available in the NG (not shown). In a 3D embodiment, this operation may be carried out with a sphere packing algorithm, and a similar operation could extend to n-dimensions. In this process, the mass of each SA node is determined by the relative size of its embedded agent group. The mass of an SA node impacts its local edge length calculation with its paired SA nodes; thus, and as depicted SAs with larger embedded agent groups have larger surrounding space. The mass of an SA particle and the degree of the node's movement is inversely proportional; thus, the higher the mass, the less its movement. FIGS. 10A and 10B depict the SA nodes being assigned coordinates using their resting locations in the FDG solution space. As depicted, the centroid of each particle is assigned a coordinate value (a seeding location), with the results seeding coordinates identified in the table 1000.

Figure 11:
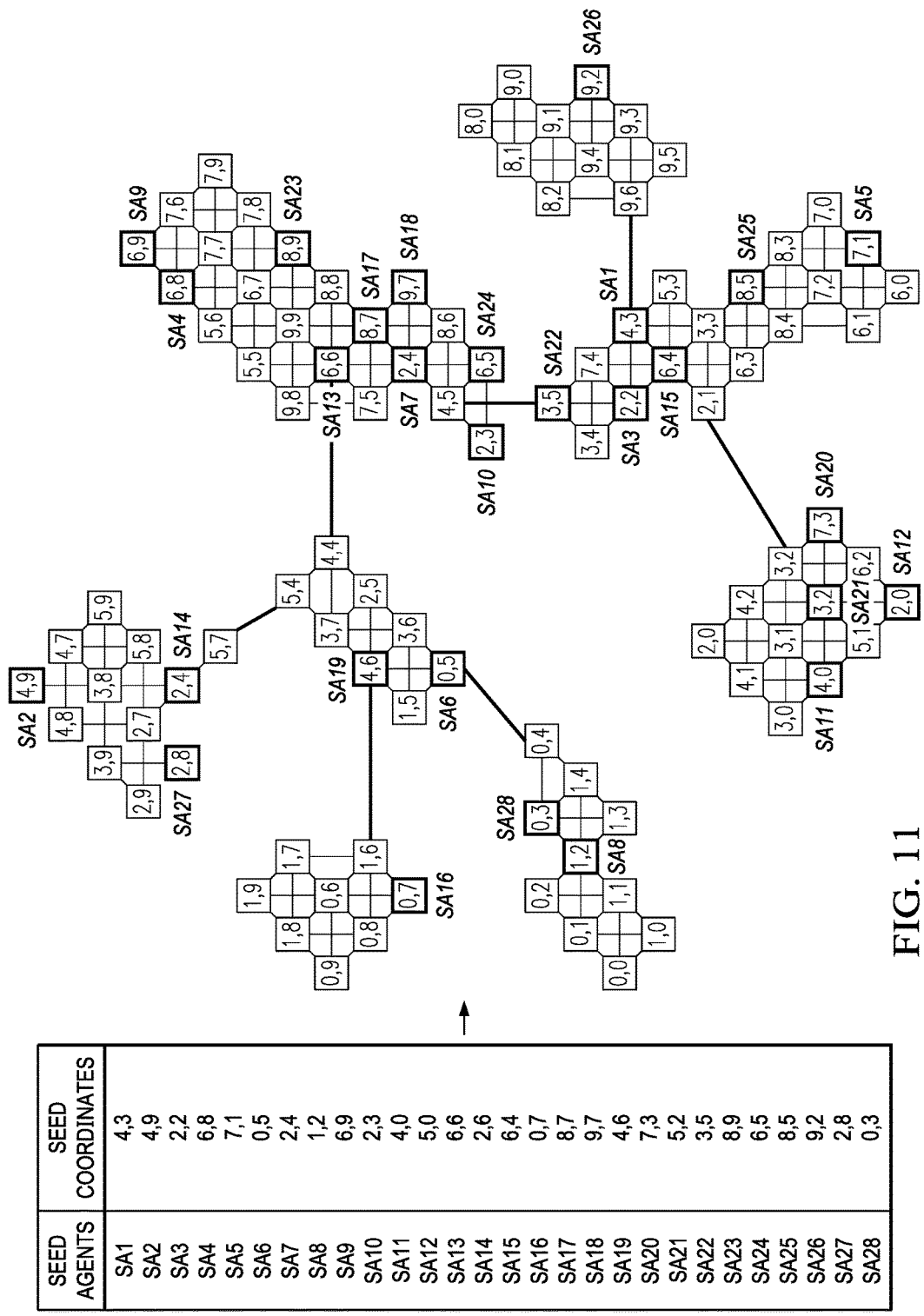
FIG. 11 depicts the partitioning of the NG after executing a local search operation seeding of the SAs on the NG vertices using their corresponding coordinates.

After the FDG is created and processed as described, the next step is to map the extents of the coordinates contained with the FDG solution space to the vertices of the network graph NG that is to be used to solve the first entity-to-second entity allocation problem. FIG. 11 depicts the result of this process. Various computational approaches can be used for this purpose. One preferred approach is to take coordinates along the boundary of the n-body solution space as well as some coordinates from within the solution space, and then apply these coordinates proportionally to select vertices on the network graph. A K-means technique to accomplish this operation is described in detail below. After these coordinates are applied, preferably a diffusion algorithm is the applied. The diffusion algorithm is one that has a time-based parameter that supports a numerical integration or Laplacian operator across neighboring NA vertices. Together, these operations result in the assignment of the extents of the range of coordinates represented in the n-body solution across the vertices of the network graph. At the end of this mapping, the NG vertices have a range of coordinate values closely-related to the range of coordinate values contained by the n-body solution space. As will be described, this mapping creates a way for updates from the n-body solution (which may occur, for example, when there are changes or updates to the agent population being mapped) to be passed directly to the follow-on step (explained below) of seeding the agents on the network group.

The following provides additional details regarding the above-described mapping operation that is used to translate the relative coordinate system of the FDG solution space to the desired number of vertices (in this example, 100) of the NG. In this approach, preferably a K-means solution is used as a bijective function to help associate the FDG solution space to the physical network graph. This solution is now described.

Assume a Red (R), Green (G), Blue (B) 3D space with values 0-255 on each of the three (x, y and z) axes. The FDG is resolved in this RGB cube. The first step is to "metricize" the full range of RGB values (i.e., from 0,0,0 to 255,255,255) to the full extent of the physical network graph. To do this, the K-means solution takes the RGB values of the eight (8) corners of the cube (0,0,0; 0,255,0; 0,255,255; 255,255,255; 255,0,0; 255,255,0; 0,0,255; 255,0,255). K-means is then used to break the full volume of the RGB cube into regions (clusters) that, in proportion, relate to the regions of the physical network graph. For example, if the network graph represents a building with eight (8) floors, the RGG cube is broken into eight (8) K-means partitions. The center point of each of these partitions is then recorded (as one of the internal solution space coordinates described above). Once these coordinates are identified, the eight (8) corner values (in this example) and the center points are then placed on specific nodes across the physical network graph, and then the diffusion algorithm is executed to grow the full range of color across all nodes of the network graph. As a result, each node on the network graph thus has a starting RGB value (its base color, or DNA) that represents a color range from (0,0,0 to 255,255,255). After running the diffusion algorithm, the seed agents are then placed on the nodes with the closest RGB (DNA) value. When the system is brought into equilibrium, each SA has an RGB value (e.g., 104,56,221) representing its respective coordinates, and SA pairs that are close in the FDG solution have similar RGB colors (i.e., their vector magnitude will be close).

For illustrative purposes, FIGS. 3, 4 and 5 depict a sequence used to map the coordinates of the FDG solution space to the network graph using a diffusion algorithm. In particular, FIG. 3 depicts coordinates of the FDG solution space as well as the vertices and edges of the network graph. FIG. 4 depicts the use of control coordinates from the FDG solution space to seed regions of the network graph. FIG. 5 depicts the result of translating/mapping each control coordinate to the network group through the diffusion process. In other words, FIGS. 3-5 depict a 2D example of how the mapping operation is used to map the relative coordinate system of the FDG solution space to the 100 vertices of the NG. The relative RGB values are shown on the left side (within the FDG solution space boundary), and the relative mappings are shown on the right side. The approximation translation uses a boundary box to a specialized numbered (RGB-based) tree growth strategy based on local node proximity. This bijection function mapping (as has been described and that is shown for a 2D example use case) typically is a one-time operation or is repeated infrequently; it does not need to be carried out for every simulation, which is the next step and that is now described.

In particular, and after the mapping (metricize) operation, the resting coordinates of the SAs (the particles) from the n-body simulation are then used to find vertices on the network graph that most closely match their respective coordinate values. The seed agents are then assigned to these vertices. Thereafter, another diffusion process is executed, which is now described. The purpose of this diffusion process is to grow the SA population onto the neighboring vertices, preferably based on the suitability of the underlying vertex coordinate value (that was identified during the preferably one-time mapping operation). At each time step during this diffusion process, the agents occupying a vertex on the network graph evaluate their neighboring vertices to see if they should occupy these neighbors, e.g., based on the suitability of their coordinate values (in RGB) relative to the coordinate values held on the vertices. If an agent from a different SA currently occupies the vertex, a negotiation is carried out to determine which SA population is better suited for that vertex. Thus, at each time step in this phase an SA tries to expand to adjacent NG vertices (while other SAs are doing likewise), and thus the diffusion process facilitates NG territory capture through swapping. Preferably, this local search strategy (in effect a "land grab" process) is further augmented by historical agent-to-vertex occupancy information. In particular, the longer the time period that an agent occupies a NG vertex the more the coordinate values of the underlying vertices move toward the agent coordinates; in effect, the agents "saturate" the vertices with their values, thereby creating a "history" of occupation (as in a pheromone). After a given number of iterations (time steps) grows the teams to some percentage (e.g., 50%), an Ant Colony Optimization (ACO) algorithm is then used to migrate ill-suited teams to better regions of the graph, and then the growth process is restarted until completed (or otherwise terminated).

Returning to the 2D example, FIG. 11 depicts the initial seeding of the SAs in the NG based on their relative positions in the FDG solution space (namely, their corresponding coordinates on the vertices of the NG). As described above, and starting at an initial time step (t=0), each seed vertex then releases its embedded agents to the adjacent vertices to search for and achieve their required count (of total embedded agents for the SA) while also taken into consideration their neighbors' needs. This results in vertices being occupied and/or released depending on the scoring system used. Algorithms that may be used during this operation include, for example, ACO (e.g., MMAS, AShrank, COAC, and others), reaction diffusion models, BUBBLE frameworks, as well as other hybrid local search strategies. FIG. 11 depicts the partitioning of the NG after the local search completes. This represents a final agent-to-resource space allocation (for the 2D example scenario).

Summarizing one preferred approach, and where the NG represents a physical space (e.g., a building model), after the force directed graph algorithm has been run, the resulting FDG solution is then mapped to a [255,255,255] cube so that each SA (agent team) is assigned an RGB color depending on is three coordinates. After this, the set of fixed teams is placed in its respective locations in the building model and a first diffusion algorithm is used to cover the RGB space in the 3D building model. The coverage of the RGB color space is guaranteed by fixing a finite set of points in the building model (the corner values and the center points on the partitions) and using them as sources that are kept fixed in addition to the colors corresponding to fixed teams. The first diffusion algorithm evolves the colors to seed the teams. Once this first diffusion map is done, the last step in the process is to apply a multi-agent algorithm to grow the teams to their required size. To this end, each team's (SA) color as obtained from the FDG is placed in its corresponding vertex in the building according to the RGB diffusion map. This is the initial seeding for all teams (SAs). From there, a second diffusion process is started to grow teams to some percentage (e.g., 50%) of their required size (based on the number of embedded agents in the respective team). Then, and after this first iteration, an Ant Colony Optimization (ACO) is then applied to the then-current placement result to correct for any misplacement of the teams. A second iteration is then initiated to apply the final diffusion to grow the teams to their full size. When the teams reach their full size, typically all of each team's embedded agents have been assigned to the physical resources (e.g., desks in the physical location as represented in the NG)).

As noted, the above description assumes a 3D solution space. As noted, this is not a limitation. The FDG is defined by and run in a dimensionally-equivalent space. Thus, and as described, a 3D FDG is executed within the bounds of a 3D solution space such as a cube, which in the preferred approach is a [255, 255, 255] color cube. Smaller or larger-dimension solution spaces may be used, with the dimensionality of the solution space driving the FDG algorithm.

Figure 12:
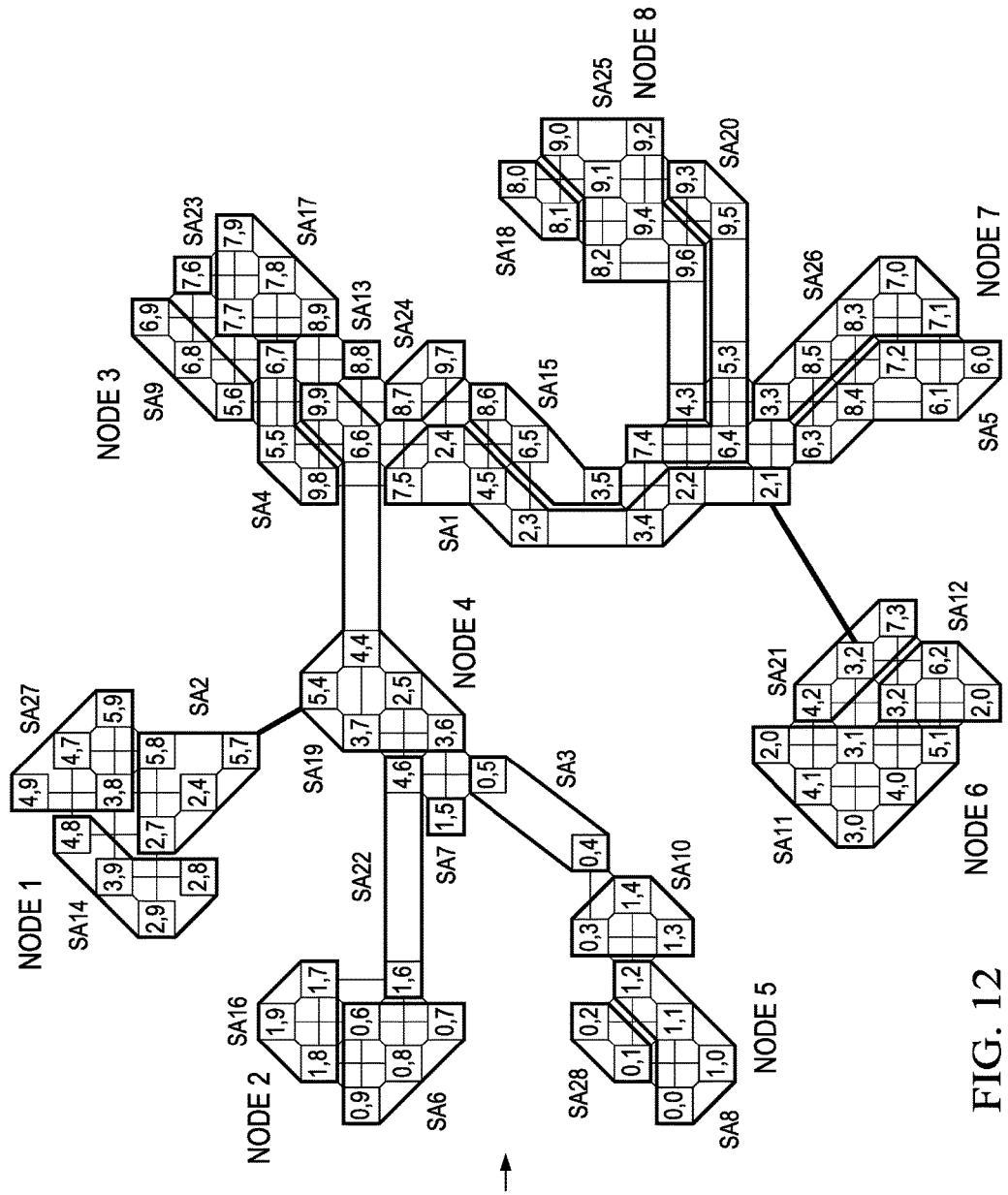
FIG. 12 depicts a result of executing multi-agent algorithms (namely, diffusion, node swapping, contraction and expansion), wherein the required number of vertices are populated by each embedded agent group.
Figure 13B:
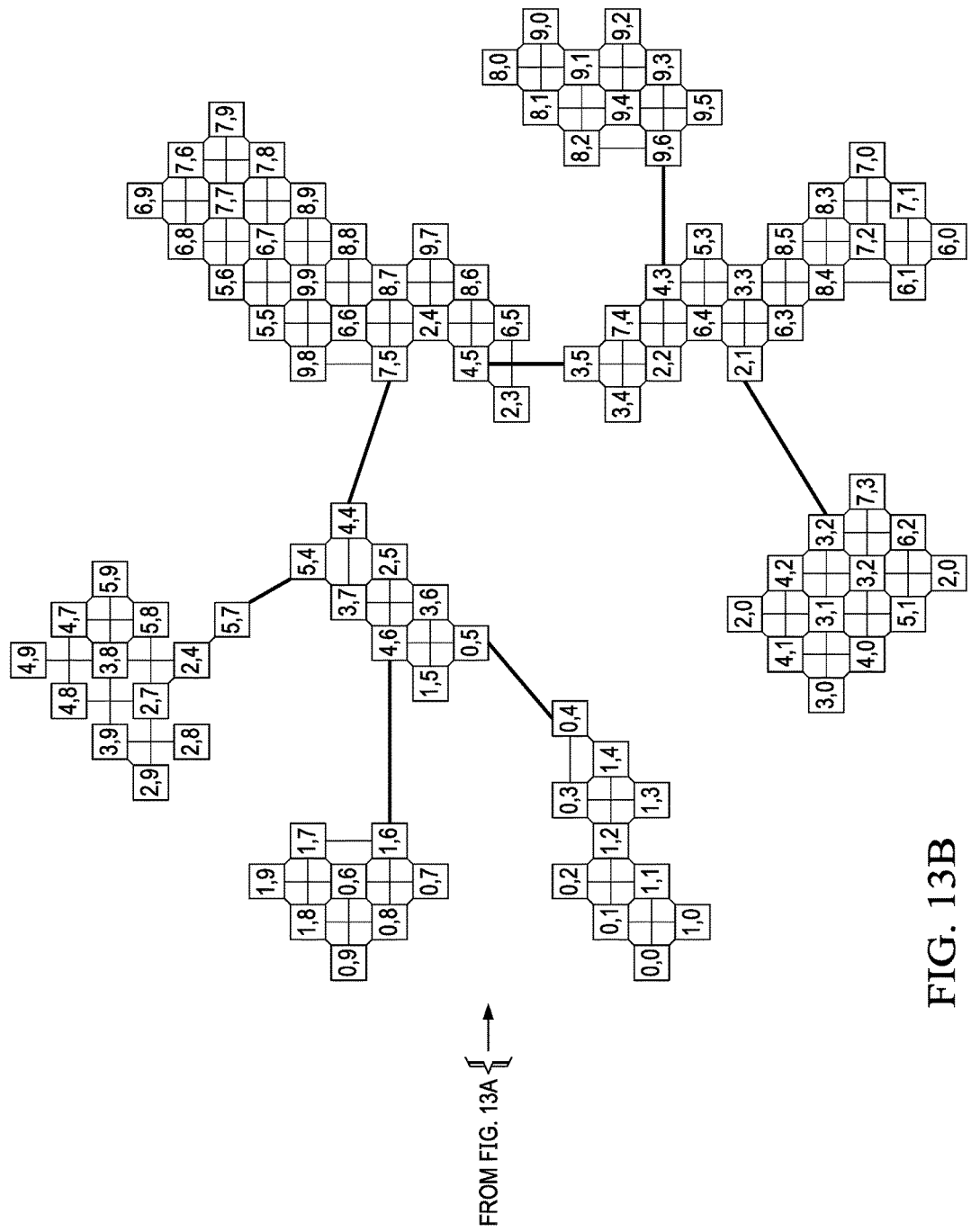

Referring back to the drawings, and in the example scenario that has been described, FIG. 12 depicts the result of executing the multi-agent algorithms (diffusion, node swapping, contraction and expansion) described, and wherein the required number of vertices have been populated by each embedded agent group. FIGS. 13A and 13B depict how the seed coordinate values of the occupying agents update the underlying coordinates of the NG vertices. These values diffuse and update the underlying coordinate mapping (updating FIG. 5) in preparation for a next evolution and SA seeding (FIG. 11).

The force-based physics space (the FDG) provides a significant advantage in that is spatially organizes nodes (each node representing a larger population) based on their adjacency suitability. Typically, FDG nodes have multiple edges to multiple nodes. As described, preferably physical attractions and repulsions (based on agent team attributes) are used. During one type of FDG creation (involving node pairs), the magnitudes of vectors between all of the pairs of node are checked to ensure that pairs of nodes with strong attractions are assigned small magnitude while those with strong repulsions are assigned larger magnitudes. This facilitates scoring of the node pairs so that an appropriate time to freeze the FDG in its solution space can be determined. When the FDG graph is frozen, the mapping operation uses the temporarily frozen data points and analyzes them to identify regions, which are then mapped to the NG. The seeding points for the NG are based on the resting positions of the FDG nodes (relative to one another). During the follow-on agent search, a diffusion method is used to leave a trace of the previous evolution of the graph vertices so that the new agents can preference occupying vertices previously occupied.

There is a significant advantage that is enabled by the initial diffusion operation (that maps the FDG solution) to the RGB cube (in the 3D embodiment). In particular, this mapping creates the basis for updates from the n-body solution to pass directly to place seed agents on the network graph. This is particularly important, as it is quite likely that new SAs will be added or deleted, or that SA counts will change. This would be a typical scenario in the workspace planning scenario described below. Should a new SA be added/deleted, or should an individual SA count change, the FDG provides a very efficient way to re-seed only the impacted SAs in the NG, after which the local search is then re-run. This approach also leverages the history of the prior resource-to-vertices assignments to achieve a new solution requiring the fewest possible changes to the previous agent-to-resource assignments.

Importantly, seeding the NG with the FDG provides significantly improved computational efficiency of a computing machine (or cluster) being used by the system to perform the above-described computations and, in particular, by avoiding local neighbor searching with respect to one or more regions NG that otherwise would provide substantially equally-fit solutions. Thus, the technique provides significant computationally efficiencies in terms of using less processor and memory resources, thereby reducing the cost and increasing the processing efficiency of the overall simulation technique. This advantage in computation is realized because the approach obviates random seeding, and it avoids the tendency of local searches (of the network graph) to become stuck is sub-optimal regions or on plateaus where many solutions are equally fit. By executing the simulation after the network graph is first primed by the agent-organized force directed graph, the system provides real-time interactive simulation(s) that generate accurate spatial insights for the physical space. In operation, execution of the simulation outputs one or more live agent-to-resource layout options (e.g., using a web page-based display) for instant scenario testing, strategic planning, and day-to-day use.

An Example Use Case—Allocating Agent Teams to Physical Office Facilities

By way of background, co-working is a style of work that involves a shared workplace, often an office, and independent activity. Hot desking, which is also known as non-reservation-based hoteling, is an office organization system that involves multiple workers using a single physical work station or surface during different time periods; such use, however, is on a first come, first serve basis without booking or any sort of assignment process.

Co-working and flexible office operators provide shared workspaces as-a-service. While the co-working model has seen growth, most of the demand is for allocated space. In co-working offices, hot desk and single allocated desk memberships typically are good values for individual workers, such as independent contractors, who work on their own. These types of solutions, however, work less well and are expensive when it comes to team space. In these situations, co-working operators struggle to compete with traditional office leases, in part because they operate on a "per-desk" model, and coupled with the fact that companies who use these services typically end up paying for more desks that are used by their workers on an average daily basis. While this problem might be addressed by a service model whereby companies were charged for allocated space on a per-member (instead of per-desk) basis, the problem of allocating users to resources (e.g., desks) in such an environment is highly-challenging due to the large number of changing variables (number of users, frequency of use, number of desks, etc.) Thus, truly efficient management of allocated space remains a challenge.

The technique of this disclosure may be used to address this problem.

Figure 14:
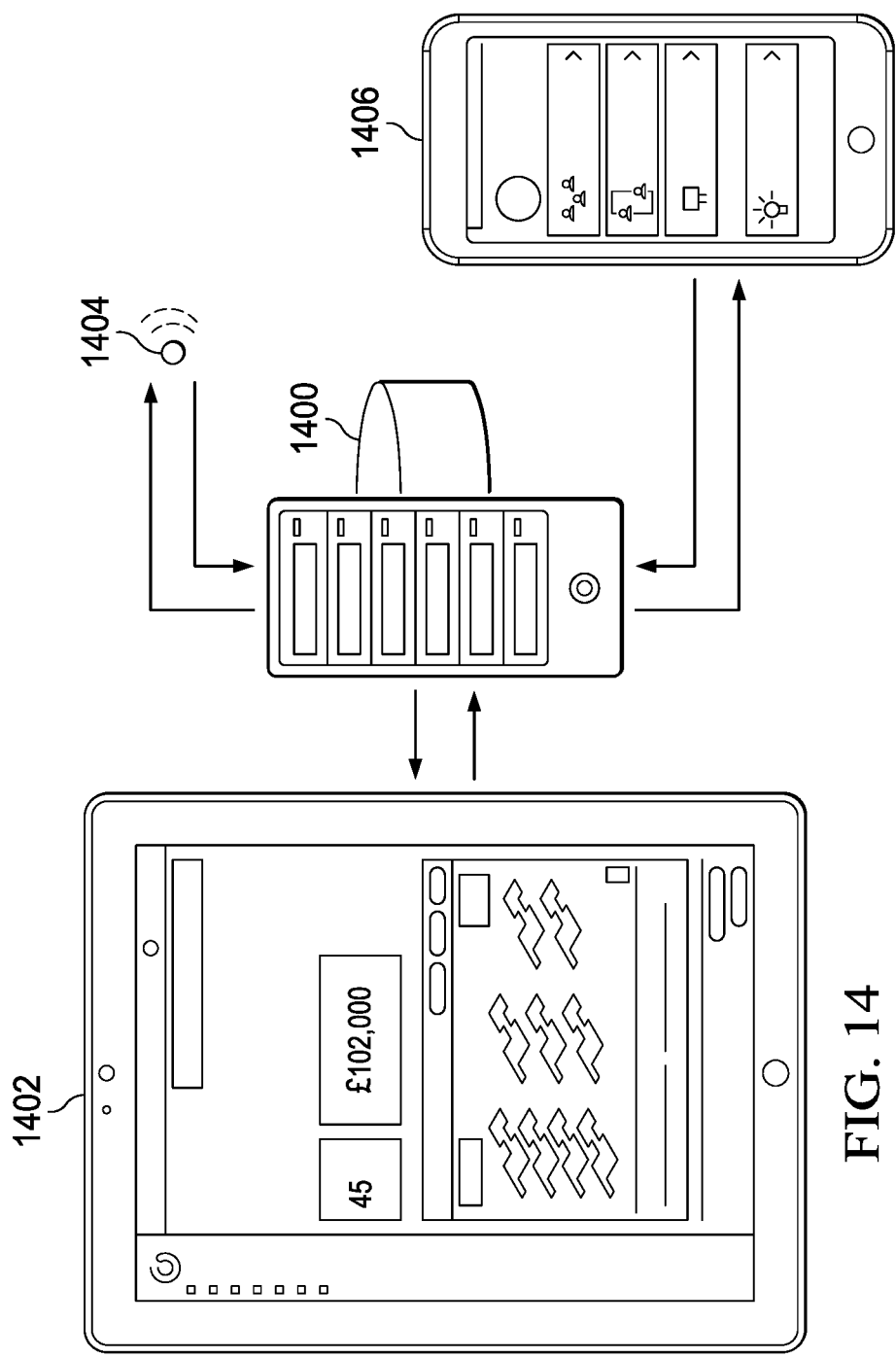
FIG. 14 depicts an implementation environment in which the techniques of this disclosure may be practiced.

In one example embodiment, a computing platform that implements the simulation techniques described above provides for intelligent building management that allocates space for dynamic organizations. The computational solutions generated by the platform eliminate resource waste, and they enable total flexibility for agents to work more collaboratively and effectively. In this embodiment, the platform is operated "as-a-service" to provide intelligent building simulation that allocates people and teams efficiently across large amounts of physical space in real-time. The platform automatically generates intelligent actionable solutions (agent-to-resource allocations) from sensor data that indicates available physical resources, and agent requirements for those resources. Utilization rates of the allocated space resources are free to ebb and flow over time, and the agent-to-resource allocations created by the platform automatically and proactively evolve in response to real use FIG. 14 depicts a typical implementation environment. A service provider entity operates a computing platform and simulation engine 1400 of this disclosure. In one embodiment, the computing platform is used to provide a co-working-as-a-service solution that efficiently allocates agents to resources of an allocated space that is being managed by the platform. In this approach, and as will be described, the NG represents a physical space (e.g., a building workspace) in which individuals are intelligently assigned to a team (an SA, as described above), and individuals can be on multiple teams through a time period (a day, a week, etc.). Using the above-described simulation technique, a team is then assigned resources (typically a group of desks) to use in a physical building location (as represented by the NG), and the number of desks assigned to the team can vary through the time period. Typically, the number of desks is significantly less than the number of persons assigned to the team (a team count).

Using the FDG-seeded NG simulation technique, the platform provides real-time allocation solutions, strategic scenario planning tools, and the like. One or more physical spaces (each an "allocated space") are available (e.g., for "rent" or "lease" or "use") from the platform. To this end, a "customer" of the platform (typically an enterprise) is provided with an "assistant" application 1402 (e.g., configured as a web-based or mobile device-based application) by which the customer obtains on-line access to the platform. The assistant application provides tools and interfaces to enable the enterprise customer to manage its forward looking allocated space needs. For example, and using the assistant application, an authorized user uploads and updates data describing the people (head-counts, team structures, schedules, etc.) and the building data (floor plans, desks and storage requirements) to be managed. This "resource" data can be input manually, by integrating data feeds directly from existing enterprise software, using application programming interfaces (APIs), and the like. In one embodiment, the data identifies the available resources that are available to be provisioned and configured in the allocated space. In a typical use case, a state of a resource is identified by a sensor that is deployed discretely under a desk in the space. Sensors 1404 typically are wireless-based, and they report resource state data (e.g., real-time desk data) back to the platform, e.g., via local WiFi systems that collect such data and deliver it over one or more communication networks. The sensor data may be augmented by other resource inventory data provided by the enterprise customer.

As also depicted, the other primary input to the platform comprises user workspace requirements, which are typically input by end users (or "agents") via mobile applications 1406. Thus, using a mobile app, an individual member of a team can input his or her workspace requirements (e.g., days and hours working, team identification, etc.), and these direct workforce inputs are collected by platform to update requirements for a team that includes the member. As will be seen, these team requirements are leveraged by the platform to drive intelligent evolution of agent-to-resource allocations according to this disclosure.

In a preferred embodiment, the technique is provided by a simulation engine. A representative implementation of the simulation engine is a computer program executing in one or more hardware processors, e.g., via a cloud-accessible service. The engine may be executed in other ways, e.g., as a standalone solution, in a virtualized environment, in a hybrid (on-premises-cloud) environment, and the like. Enterprise customers obtain and use the assistant application to identify, provision and manage their allocated space; end users use their mobile apps to identify their individual use requirements. The simulation engine takes as input(s) the data describing the space, the end user requirements, etc. to derive the NG, executes agent-to-workspace resource simulation(s) using the FDG-seeded NG, and then provides the output(s) to the enterprise and its end users. Simulations typically are carried out for an allocated space continuously and periodically, or on-demand as needed, preferably on a subscription-basis. As the agent team evolves, a simulation is re-executed, but with the added computationally benefit (as described above) of a tightly-constrained local search.

The simulation engine may run simulations on behalf of multiple enterprises, spaces, or combinations thereof. Communications with the platform preferably are secured end-to-end.

The graph optimization and allocation technique of this disclosure provides significant advantages. The space management platform as described leverages network graph-based optimizations, potentially augmented by machine learning, to efficiently manage allocated team desk space in a workspace environment. The simulation engine processes sensor data and evolving team requirements to ensure that teams get exactly the allocated space they need. By increasing efficiencies in this manner, service providers, flexible office providers, and others can provide co-working solutions for their customers but no longer have to price such solutions on a per desk basis; instead, these providers have a way to charge on a per active member basis, thereby increasing density and driving margin for these types of solutions.

The approach herein has significant advantages over techniques such as hot desking, wherein desks are not assigned and people use what is available on a first come, first serve basis. Hot desking has been a source of significant employee anxiety and frustration in the workforce, and the technique of this disclosure (wherein people are intelligently assigned to a team based in part on the force directed graph) provides a smart desk assignment that addresses the problems associated with the prior art. As has been described, in the approach herein people are intelligently assigned to a team, and people can be on multiple teams through the relevant time period. The team is then assigned a group of desks to use, and the number of desks assigned to the team can vary through the time period. As also noted, typically the number of desks is far less than the full team count, and this enables much higher density of use and obviates per desk pricing models.

More generally, the approach herein provides for an intelligent building management platform that allocates space for dynamic organizations. It enables smart desk assignment based on dynamic team structures and networks of collaborators. The approach eliminates waste, saves money, and enables total flexibility for people to work more collaboratively and effectively. By executing the simulation(s) in the manner described, the platform immediately reveals and consolidates pockets of wasted space, and it creates a step-by-step roadmap on how to best to re-use that valuable real estate. The simulation(s) are carried out in real-time and in a computationally-efficient manner, thereby increasing desk utilization without stressful hot desking or difficult to use booking apps. Instead of spending hours reviewing and attempting to manage desk utilization data, the platform automatically generates intelligent actionable solutions from the data. In this way, utilization rates are free to ebb and flow over time, but the agent-to-resource allocations automatically and proactively evolve in response to real use. Changes to headcounts and teams can be managed instantly by executing a new simulation, and thus the platform can find the best way to accommodate each team with the least amount of disruption to the existing space allocations across the building (or even a larger real-estate portfolio being managed by the system). The platform enables user to re-think space allocations without specialized space planners or designers. The simulation output may be augmented to include move information for all personnel that are affected, thereby helping them locate their new workspace(s).

As noted above, the technique herein is not limited to the agent-to-workspace allocation example. Another example scenario, as previously noted, involves allocation of computing workloads to processing units in a distributed computing environment. Further allocation example scenarios are identified below, although a skilled person will appreciate that the FDG-seeding approach herein provides a framework or methodology that can be used to provide optimized solutions for a graph partitioned-data set, irrespective of what that data set represents (in the real world).

Enabling Technologies

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU).

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

While the technique of this disclosure finds particular applicability in the flexible office environment, this is not a limitation. The approach may be used in many other operating environments involving entity organization, e.g., seat booking (in theaters, for airline travel, etc.), organizing products in a retail environment (e.g., where products are agents that have inter-relationships based on likelihood of consumer purchase), organizing the layout of manufactured products (silicon chips), social networks (the community detection problem), vehicle routing, biological networks, protein construction, image processing, materials science (e.g., with the nodes corresponding to atoms in a quantum meta-material), and many other potential applications. For example, consider a warehouse full of products that are organized to best support quick retrieval and shipping based on customer profiles. In this scenario, the warehouse is represented by the NG, with each shelf containing several vertices. With the simulation engine, a company can pinpoint where a new product sits within their product ecosystem (the SAs) and then instantly make room for a new product in the NG with the least amount of disruption to the existing products already assigned to the rest of the vertices. As noted above, this is a particular advantage of the mapping operation, which enables the new product to be added (changing an existing SA configuration, or perhaps adding a new SA that includes the new product) by making only a marginal change in seed points, thereby ensuring that the local search protocol results in a very similar solution with only the required disruption to accommodate the new/modified SA. This is the technique exploited for adding new teams in the building management solution, wherein when a new team is added (or others shrink or grow) the simulation finds the best location for making changes while requiring the least disruption to other teams.

What is claimed is as follows:

1. A method operative in a computing system to associate a set of first entities to a set of second entities, wherein a second entity corresponds to a vertex in a network graph, comprising:
   associating a grouping of first entities with a particle of a set of particles, each particle having an attribute set;
   configuring the set of particles into a force directed graph, wherein the particles are configured with respect to one another according to attractions or repulsions derived from the particle attribute sets;
   bringing the force directed graph into an equilibrium state;
   thereafter mapping the particles of the force directed graph onto the network graph; and
   executing a simulation against the network graph that has been mapped with the particles of the force directed graph to associate the set of first entities to the set of second entities;
   wherein mapping the network graph with the particles of the force directed graph improves efficiency of the computing system executing the simulation by obviating random mapping of the network graph, and by avoiding local neighbor searching with respect to one or more regions of the network graph that otherwise provide substantially equally-fit solutions.

2. The method as described in claim 1 wherein a particle represents a population of first entities to be assigned to a vertex in the network graph.

3. The method as described in claim 1 wherein a first entity is a computing job, and a second entity is a processing unit on which the computing job or a portion thereof executes.

4. The method as described in claim 1 further including outputting a first entity-to-second entity association derived from the simulation.

5. The method as described in claim 1 further including adjusting the force directed graph to create an adjusted force directed graph based on one of: removing a particle, adding a particle, and modifying a particle.

6. The method as described in claim 5 further including:
   re-mapping given ones of the particles of the adjusted force directed graph into the network graph; and
   re-executing the simulation against the network graph that has been re-mapped with the particles of the adjusted force directed graph.

7. The method as described in claim 1 further including:
storing a trace of a first entity-to-second entity mapping; and
re-executing the simulation at least in part using the trace so that additional first entities are preferentially assigned network graph vertices previously occupied by first entities.

8. The method as described in claim 1 wherein configuring the set of particles into the force directed graph comprises spatially organizing pairs of particles based on their adjacency suitability.

9. The method as described in claim 8 wherein adjacency suitability is determined by evaluating magnitudes of interconnection vectors between all pairs of the particles, wherein particle pairs with strong attractions have small magnitude and particle pairs with strong repulsions have large magnitudes.

10. The method as described in claim 1 wherein the method is carried out in a computing cluster comprising a set of processing entities, wherein at least some of the processing entities are in communication with one another, and wherein mapping the particles of the force directed graph onto the network graph improves a processing efficiency of the computing cluster by minimizing communications among processing entities during execution.

11. The method as described in claim 1 wherein the network graph is n-dimensional.

12. The method as described in claim 1 wherein the network graph has a configuration that is determined by a topology of resources within a workspace.

13. The method as described in claim 12 further including receiving information from at least one agent identifying one or more preferences for the workspace resources.

14. The method as described in claim 1 wherein a first entity is a physical product, and the vertex in the network graph is a shelf location in a warehouse.

15. The method as described in claim 1, wherein mapping the particles of the force directed graph onto the network graph translates a relative coordinate system of a solution space of the force directed graph to a number of vertices in the network graph.

16. The method as described in claim 15 wherein translation of the relative coordinate system of the solution space of the force directed graph to the number of vertices generates a color map.

17. The method as described in claim 16, further including:
using the color map to generate an adjusted force directed graph, and
re-mapping the network graph with the adjusted forced directed graph.

18. The method as described in claim 1 wherein executing the simulation includes executing a node swapping local search protocol against the network graph that has been mapped with the particles of the force directed graph, thereby associating the set of first entities to the set of second entities.

19. The method as described in claim 18 further including:
storing a trace of a first entity-to-second entity mapping generated upon an initial execution of the node swapping local search protocol; and
re-executing the node swapping local search protocol using the trace so that additional first entities are preferentially assigned network graph nodes previously occupied by first entities.

20. The method as described in claim 1 wherein the set of first entities are associated to the set of second entities in accordance with an entity organization requirement in a particular operating environment.

21. The method as described in claim 1 wherein a particle represents a population of first entities to be assigned to a vertex in the network graph.

22. The method as described in claim 21 wherein a first entity is an agent, and the node in the network graph is a resource associated with a physical location.

23. Apparatus, comprising:
a processor; and
computer memory holding computer program instructions comprising program code executed by the processor to associate a set of first entities to a set of second entities, wherein a second entity corresponds to a vertex in a network graph, the program code comprising:
program code to associate a grouping of first entities with a particle of a set of particles, each particle having an attribute set;
program code to configure the set of particles into a force directed graph, wherein the particles are configured with respect to one another according to attractions or repulsions derived from the particle attribute sets;
program code to bring the force directed graph into an equilibrium state;
program code to map the particles of the force directed graph onto the network graph; and
program code to execute a simulation against the network graph that has been mapped with the particles of the force directed graph to associate the set of first entities to the set of second entities;
wherein mapping the network graph with the particles of the force directed graph improves efficiency of the apparatus by obviating random mapping of the network graph, and by avoiding local neighbor searching with respect to one or more regions of the network graph that otherwise provide substantially equally-fit solutions.

24. A computer program product in a non-transitory computer-readable medium, the computer program product comprising program code executable in a computing entity to assign a set of first entities to a set of second entities, wherein a second entity corresponds to a vertex in a network graph, the program code comprising:
program code to associate a grouping of first entities with a particle of a set of particles, each particle having an attribute set;
program code to configure the set of particles into a force directed graph, wherein the particles are configured with respect to one another according to attractions or repulsions derived from the particle attribute sets;
program code to bring the force directed graph into an equilibrium state;
program code to map the particles of the force directed graph onto the network graph; and
program code to execute a simulation against the network graph that has been mapped with the particles of the force directed graph to associate the set of first entities to the set of second entities;
wherein mapping the network graph with the particles of the force directed graph improves efficiency of the computing entity by obviating random mapping of the network graph, and by avoiding local neighbor searching with respect to one or more regions of the network graph that otherwise provide substantially equally-fit solutions.

\* \* \* \* \*